(12) United States Patent
Rabin et al.

(10) Patent No.: US 8,526,621 B2
(45) Date of Patent: Sep. 3, 2013

(54) METHOD AND APPARATUS FOR TIME-LAPSE CRYPTOGRAPHY

(75) Inventors: Michael O. Rabin, Cambridge, MA (US); Christopher A. Thorpe, Lincoln, MA (US)

(73) Assignee: President And Fellows of Harvard College, Cambridge, MA (US)

( * ) Notice: Subject to any disclaimer, the term of this patent is extended or adjusted under 35 U.S.C. 154(b) by 624 days.

(21) Appl. No.: 12/517,088

(22) PCT Filed: Nov. 30, 2007

(86) PCT No.: PCT/US2007/086101
§ 371 (c)(1),
(2), (4) Date: Feb. 24, 2010

(87) PCT Pub. No.: WO2008/127446
PCT Pub. Date: Oct. 23, 2008

(65) Prior Publication Data
US 2010/0185863 A1     Jul. 22, 2010

Related U.S. Application Data

(60) Provisional application No. 60/872,232, filed on Dec. 1, 2006.

(51) Int. Cl.
*H04L 9/08*     (2006.01)
(52) U.S. Cl.
USPC ............ 380/282; 380/247; 380/277; 713/186
(58) Field of Classification Search
USPC .................................. 380/277, 247; 713/186
See application file for complete search history.

(56) References Cited

U.S. PATENT DOCUMENTS

| | | |
|---|---|---|
| 5,495,532 A | 2/1996 | Kilian et al. |
| 6,363,365 B1 | 3/2002 | Kou |
| 6,603,857 B1 | 8/2003 | Batten-Carew et al. |
| 7,240,198 B1 | 7/2007 | Pinkas et al. |
| 7,324,645 B1 * | 1/2008 | Juopperi et al. ............. 380/247 |
| 8,024,274 B2 | 9/2011 | Parkes et al. |

(Continued)

FOREIGN PATENT DOCUMENTS

| | | |
|---|---|---|
| JP | 2001076061 A | 3/2001 |
| WO | 0111527 A2 | 2/2001 |

OTHER PUBLICATIONS

Time-Released Cryptography by Wenbo Mao.*

(Continued)

*Primary Examiner* — Nathan Flynn
*Assistant Examiner* — Phuoc Tran
(74) *Attorney, Agent, or Firm* — Lando & Anastasi, LLP

(57) ABSTRACT

In one embodiment, a Time-Lapse Cryptography Service is provided based on a network of parties. Senders encrypt their messages with this public key whose secret key is not known to anyone—not even a trusted third party—until a predefined and specific future time T+.delta., at which point the secret key is constructed and published. In one example, the secret key can only be known after it is constructed. At or after that time, anyone can decrypt the cipher text using this secret key. In one embodiment, a method for cryptographic encoding is provided, including generation of cryptographic key components by a plurality of parties, where participation of the parties is verified. A public key is constructed from a plurality of key components.

27 Claims, 7 Drawing Sheets

(56) References Cited

U.S. PATENT DOCUMENTS

| | | |
|---|---|---|
| 2001/0056394 A1 | 12/2001 | Hamada |
| 2002/0082967 A1 | 6/2002 | Kaminsky et al. |
| 2003/0046561 A1 | 3/2003 | Hamilton |
| 2003/0055662 A1 | 3/2003 | Collins |
| 2003/0074330 A1 | 4/2003 | Asokan et al. |
| 2003/0198348 A1* | 10/2003 | Mont et al. ............... 380/277 |
| 2005/0060555 A1* | 3/2005 | Raghunath et al. ......... 713/186 |
| 2006/0190378 A1 | 8/2006 | Szydlo |
| 2007/0143608 A1 | 6/2007 | Zeng et al. |
| 2009/0177591 A1 | 7/2009 | Thorpe et al. |
| 2009/0327141 A1 | 12/2009 | Rabin et al. |
| 2011/0295752 A1 | 12/2011 | Parkes et al. |

OTHER PUBLICATIONS

Riverst R.L. et al: "Time lock puzzles and time release Crypto" Internet Citation, [Online] pp. 1-9, XP002327209 Retrieved from the Internet: URL:http://theory.lcs.mit.edu/rivers/RiverestShamirWagner-timelock.pdf> [retrieved on May 4, 2005].

M.O. Rabin and J.O. Shallit. Randomized algorithms in number theory. Communications in Pure and Applied Mathematics, 39:239-256, 1986.

M.O. Rabin and C. Thorpe. Time-lapse cryptography. Technical report TR-22-06, Harvard University School of Engineering and Computer Science, 2006.

P.G. Bradford, S. Park, and M.H. Rothkopf. Practical completion incentive problems in cryptographic Vickrey auctions. Technical Report RRR Mar. 2004, Rutgers Center for Operations Research (RUTCOR), 2004.

F. Brandt and T. Sandholm. (Im)possibility of unconditionally privacy-preserving auctions. In Proc. 3rd Int. Conf. on Autonomous Agents and Multi-Agent Systems, pp. 810-817, 2004.

D.B. Keim and A. Madhavan. The upstairs market for large-block transactions: Analysis and measurement of price effects. Review of Financial Studies, 9:1-36, 1996.

M. Lepinski, S. Micali, and a. shelat. Fair zero-knowledge. In Proc. Theory of Cryptography Conference, pp. 245-263, 2005.

M.O. Rabin, R.A. Servedio, and C. Thorpe. Highly efficient secrecy-preserving proofs of correctness of computations and applications. In Proc. IEEE Symposium on Logic in Computer Science, 2007.

Shepherd Smith & Edwards. Citigroup, Merrill Lynch and Lehman ex-brokers face retrial in eavesdropping case. Stockbroker Fraud Blog, May 27, 2007. http://www.stockbrokerfraudblog.com/2007/05/exbrokers_of_citigroup_merrill_1.html.

C. Thorpe and D.C. Parkes. Cryptographic securities exchanges. In Proc. Financial Cryptography and Data Security, 2007.

S.W. Smith. Trusted Computing Platforms: Design and Applications. Springer, New York, 2005. Second Try.

A. Menezes, P. Oorschot, and S. Vanstone. Handbook of Applied Cryptography. CRS Press, 1997, Part II of II. (Second Upload).

A. Menezes, P. Oorschot, and S. Vanstone. Handbook of Applied Cryptography. CRS Press, 1997, Part I of II. (Second Upload).

Kilian et al. "A note on efficient zero-knowledge proofs and arguments", 24th Annual ACM STOC—5/92/Victoria, B.C. Canada, 1992.

International Search Report—PCT/US2007/086101—Date of Mailing Nov. 26, 2008.

Mao et al. "Time-Released Cryptography" Mar. 9th, 2001* © Copyright Hewlett-Packard Company 2001. *Internal Accession Date Only.

Dreyfus will pay $20.5 million to settle lawsuit. The New York Times, Jun. 22, 2011.

Settlement reached with five specialist firms for violating Federal securities laws and NYSE regulations. U.S. SEC Press Release, 2004. http://www.sec.gov/news/press/2004-42.htm.

J. Anderson. S.E.C. is looking at stock trading. The New York Times, Feb. 6, 2007.

B. Biais, L. Glosten, and C. Spatt. Market microstructure: a survey of microfoundations, empirical results and policy implications. Journal of Financial Markets, 8(2): 217-264, May 2005.

P. Bogetoft, I. Damgard, T. Jakobsen, K. Nielsen, J. Pagter, and T. Toft. A practical implementation of secure auctions based on multiparty integer computation. In Proc. 10th International Conference on Financial Cryptography and Data Security (FC 2006), 2006.

F. Boudot. Efficient proofs that a committed number lies in an inteval. In Proc. EUROCRYPT '00, pp. 431-444, 2000.

C. Bray, Two ex-Van der Moolen specialists are convicted of security fraud. The Wall Street Journal, Jul. 15, 2006.

I. Damgard and M. Jurik. A generalisation, a simplification and some applications of Paillier's probabilistic public-key system. In Proceedings of Public Key Cryptography '01, 2001.

G. Di Crescenzo. Privacy for the stock market. Lecture Notes in Computer Science, 2339:269 ff., 2002.

Y. Frandel, Y. Tsiounis, and M. Yung. "Indirect Discourse Proofs": Achieving efficient fair off-line E-cash. In K. Kim, editor, Advances in Cryptology: Proceedings of ASIACRYPT 1996, Kyongju, Dorea, No. 1163 in Lecture Notes in Computer Science, Berlin, 1996. Springer Verlag.

G. Gemmill. Transparency and liquidity: A study of block trades on the London Stock Exchange under different publication rules. Journal of Finance, 51:1765-1790, 1994.

L. Harris, Trading and Exchanges. Oxford University Press, 2003.

D.B. Keim and A. Madhavan. The upstairs market for large-block transactions: Analysis and measurement of price effects. Reviews of Financial Studies, 9:1-36, 1996.

H. Lipmaa, N. Asokan, and V. Niemi. Secure Vickrey auctions without threshold trust. In Proc. 6th International Conference on Financial Crypography (FC 2002), pp. 87-101, 2002.

A. Madhavan. Market microstructure: A survey. Mar. 8, 2000.

S. Matsuo and H. Morita. Secure protocol to construct electronic trading. IEICE Transactions on Fundamentals of Electronics, Communications, and Computer Sciences, E84-A(1):281-288, 2001.

Cryptographie à Clé Publique Basée sur la Résiduosité de Degré Composite. PhD thesis, École Nationale Supérieure des Télécommunications, 1999.

P. Pallier. Public-key cryptosystems based on composite residuosity classes. In Proc. EUROCRYPT '99, pp. 223-239, 1999.

D.C. Parkes, M.O. Rabin, S.M. Shieber, and C.A. Thorpe. Practical secrecy-preserving, verifiably correct and trustworthy auctions. In ICEC '06: Proceedings of the 8th international conference on Electronic commerce, pp. 70-81, New York, NY, USA 2006. ACM Press.

B. Rindi. Transparency, liquidity and price formation. In Proceedings of the 57th European Meeting of the Econometric Society, 2002.

H.R. Stoll. Market microstructure. in G.M. Constantinides, M. Harris, and R. Stulz, editors, Handbook of the Economics of Finance. Elsevier Science B.V., 2003.

M. Szydlo. Risk assurance for hedge funds using zero knowledge proofs. In Proc. 9th International Conference on Financial Cryptography and Date Security (FC 2005), 2005.

C. Wang, H. Leung, and Y. Wang. Secure dobule auction protocols with full privacy protection. In formation Security and Cryptography—ICISC 2003: 6th International Conference, 2003.

M. Yookoo and K. Suzuki. Secure multiagent dynamic programming based on homomorphic encryption and its application to combinatorial auctions. In Proc. First Int. Conf. on Autonomous Agents and Multiagent Systems, 2002.

J. Baek, R. Safavi-Naini, and W. Susilo. Token-controlled public key encryption. In R.H. Deng, F. Beo, H. Pang, and J. Zhou, editors, Proceedings of ISPEC 2005, vol. 3439 of Lecture Notes in Computer Science, pp. 386-397. Springer Verlag, 2005.

M. Bellare and S. Goldwasser. Verifiable partial key escrow. In ACM Conference on Computer and Communications Security, pp. 78-91, 1997.

I.F. Blake and A.C.-F. Chan. Scalable, server-passive, user-anonymous timed release public key encryption from bilinear pairing, Sep. 7, 2004, Sep. 24, 2004.

D. Boneh and M.K. Franklin. Efficient generation of shared RSA keys. In advances in Cryptology—CRYPTO, vol. 1294 of Lecture Notes in Computer Science, pp. 425-439. Springer Verlag, 1997.

J.H. Cheon, N. Hopper, Y. Kim, and I. Osipkov. Timed-release and key-insulated public key encryption. Cryptology ePrint Archive, Report 2004/231, 2001.

G.D. Crescenzo, R. Ostrovsky, and S. Rajagopalan. Conditional oblivious transfer and timed-release encryption. Lecture Notes in Computer Science, 1592:74 ff., 1999.

Y. Dodis and D.H. Yum. Time capsul signature. Conference: Financial Cryptography 2005.

T. ElGamal. A public key cryptosystem and a signature scheme based on discrete logarithms. IEEE Trans. Information Theory, IT-31(4): 469-472, 1985.

P. Feldman. A practical scheme for non-interactive verifiable secret sharing. IEEE Symposium on Foundations of Computer Science, pp. 427-437, 1987.

M.J. Fishman and K.M. Hagerty. The mandatory disclosure of trades and market liquidity. The Review of Financial Studies, 8(3):637 ff., 1995.

Y. Frankel, P.D. MacKenzie, and M. Yung. Robust efficient distribution RSA-key generation. In Proceedings of the seventeenth annual ACM symposium on Principles of Distributed Computing, p. 320, 1998.

R. Gennaro, S. Jarecki, H. Krawczyk, and T. Rabin. Secure destributed key generation for discrete-log based cryptosystems. Lecture Notes in Computer Science, 1592:295 ff., 1999.

A. Herzberg., M. Jakobsson, S. Jarecki, H. Krawczyk, and M. Yung. Proactive public key and signature systems. In ACM Conference on Computer and Communications Security, pp. 100-110, 1997.

T.C. May. Time-release crypto. in the Cyphemomicon: Cypherpunks FAQ and More, v. 0.666, chapter 14.5. Sep. 1994.

R.C. Merkle. Secure communications over insecure channels. Communications of the ACM, 21 (4): 294-229, Apr. 1978.

A. Fiat and A. Shamir. how to prove yourself: practical solutions to identification and signature problems. In proceedings of CRYPTO '86, pp. 186-194, 1987.

T.P. Pedersen. Non-interactive and information-theoretic secure verifiable secret sharing. In Advances in Cryptology-CRYPTO, Lecture Notes in Computer Science, pp. 129-140. Springer Verlag, 1991.

J. Kilian. A note on efficient zero-knowledge proofs and arguments. In Proceedings of STOC '92, pp. 723-732, 1992.

A. Shamir. how to share a secret. Communications of the ACM, 22 (11):613-613, Nov. 1979.

G. Brassard, D. Chaum, and C. Crepeau. Minimum disclosure proofs of knowledge. Journal of Computer and System Sciences, 37:156-189, 1988.

E. Brickell, D. Chaum, I. Damgard, and J.V. de Graaf. Gradual and verifiable release of a secret. In Proceedings of CRYPTO '87, vol. LNCS 293, pp. 156-166, 1988.

J. Camenisch and V. Shoup. Practival verifiable encryption and decryption of discrete logarithms. Full length version of extended abstract in Proc. Crypto 2003, available at http://eprint.iacr.org/2002/161.pdf, 2003.

I. Damgard, T. Pedersen, and B. Pfitzmann. Statistical secrecy and multibit commitments. IEEE Transactions on Information Theory, 44(3): 1143-1151, 1998.

J. McHugh. Covert Channel analysis. Chapter 8 of Handbook for the Computer Security Certification of Trusted Systems, NRL Technical Memorandum, available at http://chacs.nrl.navy.mil/publications/handbook/COVCHAN.pdf, 1996.

Stubblebine S.G. et al: Fair on-line auctions without special trusted parties: Financial Cryptography. Third International Conference, FC'99. Proceedings (Lecture Notes in Computer Science vol. 1648) Springer-Verlag Berlin, Germany, 1999, pp. 230-240, XP00002509558 ISBN: 3-540-66362-2.

* cited by examiner

METHOD AND APPARATUS FOR TIME-LAPSE CRYPTOGRAPHY

CROSS-REFERENCE TO RELATED APPLICATIONS

This application is a US national phase entry under 35 U.S.C. §371 of PCT/US2007/086101 filed Nov. 30, 2007, which claims the benefit of priority of U.S. Provisional Application Ser. No. 60/872,232 filed Dec. 1, 2006, both of which is incorporated herein by reference in their entirety.

FEDERALLY SPONSORED RESEARCH

This invention was made with government support under CCR-0205423 awarded by the National Science Foundation. The Government has certain rights in the invention.

BACKGROUND

1. Field of Invention

Method and apparatus for facilitating time based cryptographic encoding and decoding.

2. Discussion of Related Art

The notion of "sending a secret message to the future" has been around for over a decade. Despite this, no solution to this problem is in common use, or even attained widespread acceptance as a fundamental cryptographic primitive. Sending a message into the future was first proposed by Timothy May, in "Time-release crytpo", since then many protocols have been proposed to encrypt messages to be sent into the future, usually under a name like "timed-release cryptography". These known methods provide only estimates of or lower bounds on elapsed time.

Solutions that do not have a fixed decryption time generally involve expensive sequential computations ("time-lock puzzles"—Merkle is generally credited with inventing these "puzzles") to recover an initial message, ensuring that the recipient cannot recover the data before some length of time. Other solutions that do not guarantee fixed time release are made possible by partial key escrow.

Some methods use known encryption techniques in which the decryption key is kept secret until a fixed revelation time. The problem has been described as a "Timed Release Encryption Problem" as a sender encrypting a message such that only a particular receiver can decrypt that message, and that only after a specific release time has passed, as verified by a single trusted, third-party time server. This solution uses a bilinear pairing on a Gap Diffie-Hellman group, which requires reasonable cryptographic assumptions. This solution is similar to those employed in identity-based cryptography. Other works sharing this connection is known as "secure timed-release public key encryption" and its equivalence to strongly key-insulated public key encryption. The solution, also based on a bilinear map, requires a trusted "timed-release public server" that periodically publishes information, based on a private secret, that enables decryption of previously encrypted texts. Other proposals include a related protocol in which digital signatures become verifiable only at a fixed future time t upon publication by a trusted third party of "some trapdoor information associated with the time t."

Other methods use "token-controlled" public key encryption. In token-controlled encryption, messages are encrypted with both a public encryption key and a secret token, and can only be decrypted with the private decryption key after the token is released.

In addition to time-lock puzzles, a similar system uses a secret decryption key and a trusted third party to create and distribute public and private keys at appropriate times. Another work uses a trusted time server and a new primitive called "conditional oblivious transfer" to send messages into the future where the server never learns the senders identity, however it does learn the receiver's identity.

SUMMARY

According to one aspect, provided is a construction and specification for an implementation of a new cryptographic primitive, "Time-Lapse Cryptography", with which a sender can encrypt a message so that it is guaranteed to be revealed at an exact moment in the future, even if this revelation turns out to be undesirable to the sender. One embodiment incorporates Pedersen distributed key generation, Feldman verifiable threshold secret sharing, and ElGamal encryption, all of which rest upon the single, broadly accepted Decisional Diffie-Hellman assumption to permit a time lapse key generation. In another embodiment, a Time-Lapse Cryptography Service is provided ("the Service") based on a network of parties who jointly perform the service.

Different implementations of the protocol are practical and secure: at a given time T the Service publishes a public key so that anyone can use it, even anonymously. In one example, senders encrypt their messages with this public key whose corresponding secret key is not known to anyone—not even a trusted third party—until a predefined and specific future time $T+\delta$, at which point the secret key is constructed and published. In one embodiment, the construction and publication of the secret key is guaranteed. Even though the secret key can only be known after it is constructed, it will be reconstructed and revealed at a predetermined time. At or after that time, anyone can decrypt the cipher text using this secret key. In another embodiment, the Service is comparable to a public utility publishing a continuous stream of cryptographic keys and subsequent corresponding time-lapse decryption keys. Other embodiments show how some specific attacks are met by specific defenses, and describe other applications of such a service, for example, one embodiment is used in sealed bid auctions, others in insider stock sales, clinical trials, and electronic voting, among a variety of possible implementations and applications.

According to one aspect of the present invention, a method for cryptographic key creation is provided. The method comprises acts of generating a cryptographic key component by a plurality of parties thereby yielding a plurality of cryptographic key components, verifying participation of the plurality of parties, constructing a public key based on at least a portion of the plurality of cryptographic key components, and generating, after a predetermined time, a secret key based on at least a portion of the plurality of cryptographic key components. According to one embodiment of the present invention, the act of generating a cryptographic key component further comprises an act of generating a public key component. According to another embodiment of the invention, the method further comprises an act of publishing the public key component. According to another embodiment of the invention, the published key component is accompanied by a digital signature. According to another embodiment of the invention, publishing the public key component comprises posting the public key component and signature to a bulletin board.

According to one embodiment of the present invention, the act of verifying participation of the plurality of parties further comprises an act of disqualifying any of the plurality of parties that did not publish the public key component.

According to another embodiment of the invention, the act of generating a cryptographic key component further comprises an act of generating a secret key component. According to another embodiment of the invention, the method further comprises an act of transforming the secret key component. According to another embodiment of the invention, the secret key component is transformed into at least one value. According to another embodiment of the invention, the act of transforming the secret key component further comprises calculating and communicating a secret share of the secret key component. According to another embodiment of the invention, the method further comprises an act of communicating the transformed secret key component to at least one of the plurality of parties.

According to one embodiment of the present invention, the act of communicating the transformed secret key component occurs through secret sharing. According to another embodiment of the invention, the method further comprises an act of digitally signing the transformed secret key component. According to another embodiment of the invention, the method further comprises an act of generating a commitment for each of the transformed secret key components. According to another embodiment of the invention, the method further comprises an act of communicating the commitment and a digital signature of the commitment. According to another embodiment of the invention, the act of communicating further comprises an act of posting the commitment and the signature to a bulletin board.

According to one embodiment of the present invention, the method further comprises an act of verifying the transformed secret key component. According to another embodiment of the invention, the method further comprises an act of disqualifying any of the plurality of parties that communicates an invalid transformed secret key component. According to another embodiment of the invention, the method further comprises an act of requiring communication of the transformed secret key component in response to a protest. According to another embodiment of the invention, the method further comprises an act of publishing the public key by at least a portion of the plurality of parties. According to another embodiment of the invention, the method further comprises an act of verifying the public key. According to another embodiment of the invention, the act of verifying a public key includes verifying a correspondence between the published cryptographic key and the transformed secret key components.

According to one embodiment of the present invention, the method further comprises an act of establishing the predetermined time. According to another embodiment of the invention, the predetermined time includes a time period for computation. According to another embodiment of the invention, the act of generating, after a predetermined time, the secret key occurs at the predetermined time. According to another embodiment of the invention, the time period for computation is negligible. According to another embodiment of the invention, the time period for computation is not significant with respect to the time elapsed to reach the predetermined time. According to another embodiment of the invention, the method further comprises an act of publishing a secret key component during the computation time period. According to another embodiment of the invention, the method further comprises an act of verifying the secret key component. According to another embodiment of the invention, the method further comprises an act of reconstructing a secret key component.

According to one embodiment of the present invention, generating, at a predetermined time, a secret key based, at least in part, on at least a portion of a plurality of cryptographic key components, further comprises constructing the secret key from at least one published secret key component. According to another embodiment of the invention, generating, at a predetermined time, a secret key based, at least in part, on at least a portion of a plurality of cryptographic key components, further comprises constructing the secret key from at least one published secret key component, further comprises constructing the secret key from at least one reconstructed secret key component. According to another embodiment of the invention, the method further comprises an act of publishing the secret key and a signature on the secret key. According to another embodiment of the invention, the method further comprises acts of using the public key to encrypt at least one of a bid in an auction, information in an insider trade, information in a trade, a ballot in an election, and data in a clinical trial, and decrypting the at least one of a bid in an auction, information in an insider trade information in a trade, a ballot in an election, and data in a clinical trial using the secret key. According to another embodiment of the invention, the method further comprises an act of providing access to a recipient of the at least one of a bid in an auction, information in an insider trade, information in a trade, a ballot in an election, and data in a clinical trial, to the secret key after the predetermined time.

According to one aspect of the present invention, a computer-readable medium having computer-readable signals stored thereon that define instructions that, as a result of being executed by a computer, instruct the computer to perform a method for cryptographic encoding is provided. The method comprises generating a cryptographic key component by a plurality of parties to yield a plurality of cryptographic key components, verifying participation of the plurality of parties, constructing a public key based on at least a portion of the plurality of cryptographic key components, and generating, after a predetermined time, a secret key based on at least a portion of the plurality of cryptographic key components. According to one embodiment of the present invention, the act of generating a cryptographic key component further comprises an act of generating a public key component. According to another embodiment of the invention, the method further comprises an act of publishing the public key component. According to another embodiment of the invention, the published key component is accompanied by a digital signature. According to another embodiment of the invention, the act of verifying participation of the plurality of parties further comprises an act of disqualifying any of the plurality of parties that did not publish the public key component.

According to one embodiment of the present invention, the act of generating a cryptographic key component further comprises an act of generating a secret key component. According to another embodiment of the invention, the method further comprises acts of transforming the secret key component, and communicating the transformed secret key component. According to another embodiment of the invention, the act of transforming the secret key component further comprises calculating a secret share of the secret key component. According to another embodiment of the invention, the act of communicating the transformed secret key component occurs through secret sharing. According to another embodiment of the invention, the method further comprises an act of generating a commitment for the transformed secret key component. According to another embodiment of the invention, the method further comprises an act of communicating the commitment and a digital signature of the commitment. According to another embodiment of the invention, the method further comprises an act of disqualifying any of the plurality of parties that communicates an invalid transformed secret key component. According to another embodiment of the invention, the method further comprises an act of publishing the public key by at least a portion of the plurality of parties.

According to one embodiment of the present invention, the method further comprises an act of verifying the public key. According to another embodiment of the invention, the method further comprises an act of establishing the predetermined time. According to another embodiment of the invention, the predetermined time includes a time period for computation. According to another embodiment of the invention, the act of generating, after a predetermined time, the secret key occurs at the predetermined time. According to another embodiment of the invention, the time period for computation is negligible. According to another embodiment of the invention, the time period for computation is not significant with respect to the time elapsed to reach the predetermined time. According to another embodiment of the invention, the method further comprises an act of publishing a secret key component during the computation time period. According to another embodiment of the invention, the method further comprises an act of verifying the secret key component. According to another embodiment of the invention, the method further comprises an act of reconstructing a secret key component. According to another embodiment of the invention, generating, at a predetermined time, a secret key based, at least in part, on at least a portion of a plurality of cryptographic key components, further comprises constructing the secret key from at least one published secret key component. According to another embodiment of the invention, the method further comprises acts of encrypting at least one of a bid in an auction, information in an insider trade, information in a trade, a ballot in an election, and data in a clinical trial, and decrypting the at least one of the bid in an auction, the information in an insider trade, the information in a trade, the ballot in an election, and the data in a clinical trial using the secret key.

According to one aspect of the present invention, a system for cryptographic encoding is provided. The system comprises, a cryptographic key generation component adapted to create a cryptographic key component for the plurality of parties to yield a plurality of cryptographic key components, a communication component for communicating between the plurality of parties, a construction component adapted to construct a public key based on at least a portion of the plurality of cryptographic key components, wherein the construction component is further adapted to generate, after a predetermined time, a secret key, based on at least a portion of a plurality of cryptographic key components, and a verification component adapted to verify proper participation of the plurality of parties. According to another embodiment of the invention, the generation component is further adapted to generate at least one public key component and at least one secret key component. According to another embodiment of the invention, the communication component is further adapted to communicate the public key component. According to another embodiment of the invention, the public key component is accompanied by a digital signature. According to another embodiment of the invention, the verification component adapted to verify proper participation of the plurality of parties is further adapted to disqualify any of the plurality of parties that did not communicate the public key component.

According to one embodiment of the present invention, the generation component is further adapted to transform the secret key component, and the communication component is further adapted to communicate the transformed secret key component. According to another embodiment of the invention, the generation component is further adapted to transform the secret key component by calculating a secret share of the secret key component. According to another embodiment of the invention, the communication component is further adapted to communicate the transformed secret key component through secret sharing. According to another embodiment of the invention, the generation component is further adapted to generate a commitment for the transformed secret key component and the communication component is further adapted to communicate the commitment and a digital signature of the commitment. According to another embodiment of the invention, the system further comprises an act of disqualifying any of the plurality of parties that communicates an invalid transformed secret key component.

According to one embodiment of the present invention, the construction component is further adapted to construct a public key based on a plurality of communicated public key components, and the communication component is further adapted to publish the public key. According to another embodiment of the invention, the verification component is further adapted to verify the public key. According to another embodiment of the invention, the communication component is further adapted to communicate the predetermined time. According to another embodiment of the invention, the predetermined time includes a time period for computation. According to another embodiment of the invention, the construction component is further adapted to construct the secret key at the predetermined time. According to another embodiment of the invention, the time period for computation is negligible. According to another embodiment of the invention, the time period for computation is not significant with respect to a time elapsed to reach the predetermined time. According to another embodiment of the invention, the communication component is further adapted to publish at least one secret key component during the computation time period.

According to one embodiment of the present invention, the verification component is further adapted to verify the secret key component. According to another embodiment of the invention, the construction component is further adapted to reconstruct at least one secret key component. According to another embodiment of the invention, the construction component is further adapted to construct a secret key from at least one published secret key component, and the communication component is further adapted to publish, at the predetermined time, the secret key. According to another embodiment of the invention, the system further comprises an encryption component adapted to encrypt at least one of a bid in an auction, information in an insider trade, information in a trade, a ballot in an election, and data in a clinical trail using the public key.

According to one aspect of the present invention, a system for cryptographic encoding is provided. The system comprises an interface adapted to access a time-lapse public key and a time-lapse secret key, an encryption component adapted to encrypt at least one of a bid in an auction, information in an insider trade, information in a trade, a ballot in an election, and data in a clinical trail using the public key, and a decryption component adapted to decrypt the at least one of the bid in an auction, the information in an insider trade, the information in a trade, the ballot in an election, and the data in a clinical trail using the secret key accessed at the predetermined time.

DETAILED DESCRIPTION

Figure 1A:
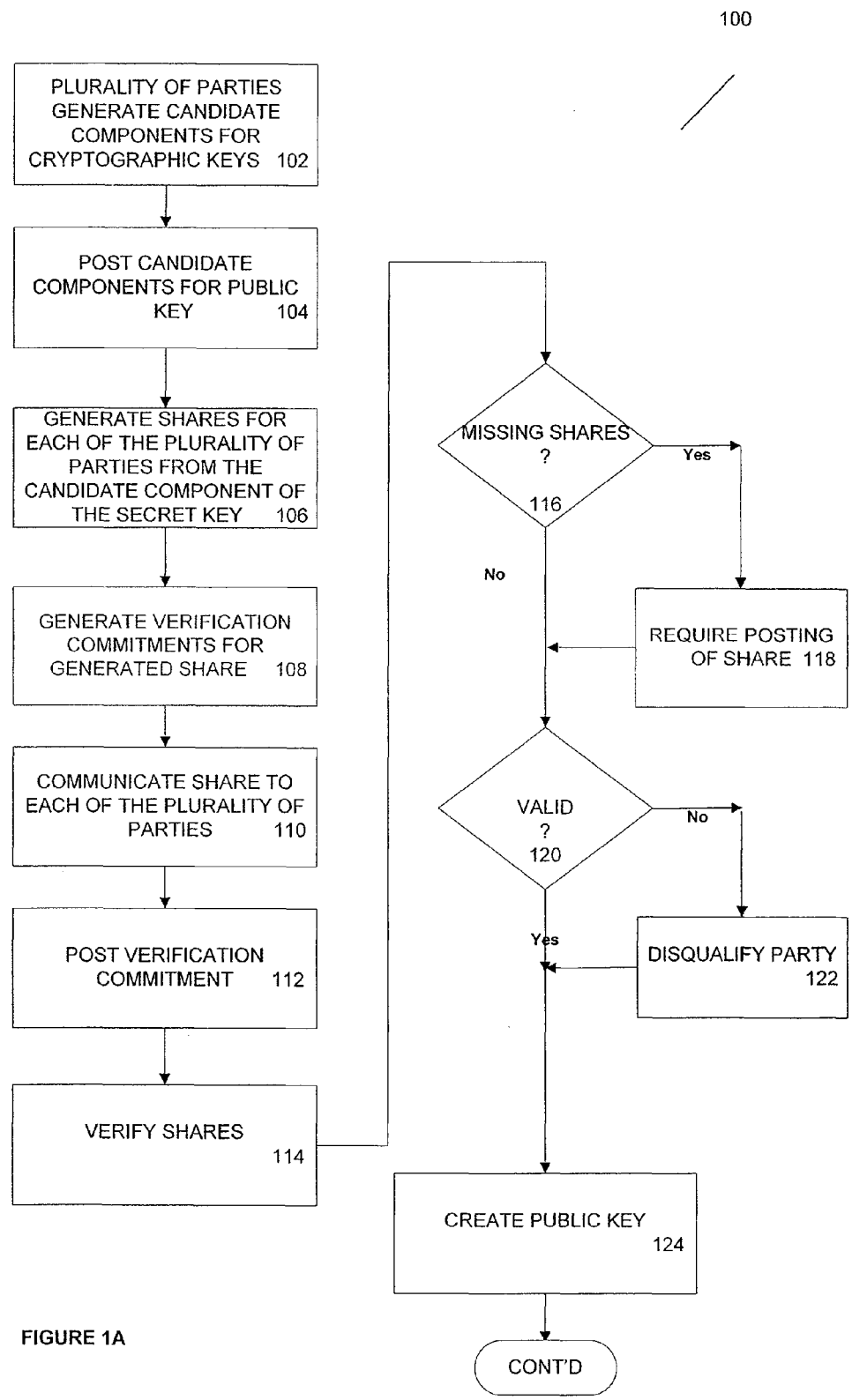
FIGS. 1A-B illustrate an example of a process implementing various aspects of the present invention.

In one example, a setting for the service is as follows: At time T, Alice wishes to send Bob a message m so that Bob may decrypt it only at or after a specified future time $(T+\delta)$. This decryption will be possible without any further action by Alice.

According this example, the "Time-Lapse Cryptography Service" ("the Service") makes this possible. At or before time T, the Service publishes a public key PK along with a statement that its corresponding secret key DK will be revealed at time $T+\delta$. Alice uses PK to encrypt m with random help r using a probabilistic encryption scheme and sends the ciphertext $c=E_{PK}(m,r)$ to Bob. She is now committed to the content of the message, although Bob cannot yet see it. At time $(T+\delta)$, the Service reconstructs and publishes DK, which Bob obtains and uses to decrypt c and recover m. (Of course, Alice, if she so wishes, can always reveal m early by sending Bob m and r.)

Some examples of objectives of one implementation of the Service are as follows:

- The Service publishes a public key PK associated with a start time T, duration $\delta$. It includes authenticating information with which users can unequivocally determine the authenticity of PK, T, and $\delta$.
- The secret key DK corresponding to PK remains completely secret until time $T+\delta$.
- At time $T+\delta$ (Plus a negligible delay $\epsilon$ for reconstruction described further below) the Service publishes the decryption key DK, along with authenticating information that allows any user to unequivocally determine the authenticity of DK.
- The Service incorporates various features so that it is resistant to attacks that attempt to generate insecure public keys, prevent the generation of public keys, reconstruct the secret keys early, or prevent accurate and timely reconstruction of secret keys.

One should understand, however, that the present invention is not limited to specific embodiments that achieve the objectives described above, and different embodiments may accomplish some, none, or different combinations of the enumerated objectives.

Additional details in various embodiments is discussed further below, and includes additional detail with respect to some associated protocols that enable Time-Lapse Cryptography in certain embodiments.

In one embodiment, the Service is anonymous: the Service knows nothing about who might be using it; this increases privacy and eliminates any incentive for early secret key reconstruction if the Service were to know a key were used for an important purpose. However, other embodiments may include some knowledge about who is using the Service. And in particular, may the knowledge may be associated with a subscription to the Service, and may still provide anonymous access to generated keys.

In other embodiments, the Service allows the originator of a message complete control over when the recipient may decrypt it, while guaranteeing that the recipient may decrypt the message at a specific future time.

The protocols implemented in some embodiments rely only on well-known cryptographic primitives: Pedersen distributed key generation (DKG), Feldman verifiable secret sharing (VSS), and the ElGamal cryptosystem. As described later, in some embodiments, the use of more recent variants of these DKG and VSS protocols are recommended to eliminate the risk of certain specific attacks which may slightly bias the uniform distribution of the public keys. As is known, the security of all three of these primitives rests on the widely believed assumption of the hardness of the Decisional Diffie-Hellman problem. This offers an elegant consistency and simplicity to security across the embodiments of our proposal. However, one should appreciate that different cryptographic primitives may also be used.

Our protocols and some embodiments implementing them, guard against such attacks as: the Service being able to prematurely reveal the decryption key; the Service refusing to reconstruct the decryption key at the required time; and the users of the Service getting inconsistent views of the stream of public and secret keys. One should appreciated that different embodiments may solve different problems associated with these types of attacks, and single embodiments may also protect against other types of attack as well as those enumerated, in addition to protecting against subsets of those types of attacks. Some examples of types of attack are discussed in greater detail below. One should understand from some embodiments that these enumerated attacks are rendered impossible (under generally accepted assumptions associated with some embodiments) and other types of attacks may also be prevented.

One embodiment names and describes its protocol as a new cryptographic primitive that may be useful in complex protocols. According to one embodiment, this primitive can be viewed as a simple cryptographic commitment that is concealing and that cannot be repudiated. To illustrate with an example, Alice is not only bound to not to change content of the message; unlike in some other commitment schemes, such as those based on cryptographic hash functions, Alice furthermore may not prevent the message from being read by refusing to reveal the message (input to the hash function). In embodiments where a binding commitment is required, Alice's digital signature on the ciphertext of a time-lapse encrypted message yields a commitment binding Alice to the still-secret content of the message. Various embodiments are presented and include details of and defenses against some real-world attacks.

Different implementations have many useful applications. We remark that time-lapse cryptography is not appropriate or sufficient for some applications. Time-lapse crypto is not appropriate when the sender wishes to revoke a message—indeed, nonrepudiation is an important property of some embodiments of our system. Other protocols, such as interactive zero-knowledge proofs, may complement time-lapse cryptography where such requirements exist.

Examples of Implementations:

Different implementations of various aspect of the present invention are discussed with respect to real world applications. One should appreciated that the details of specific implementations should not be interpreted as limiting, nor should the invention disclosed be limited to the specific implementations and/or real world situations disclosed.

Bids in Sealed-bid Auctions

According to one aspect, there exists the need for users to issue commitments that are secret even to trusted or partially trusted parties acting in concert with the user. For example, bidders wish to issue commitments to their bids that are secret to even the auctioneer during an auction—other bidders desire that those bids can not be repudiated after the close of the auction. One implementation prevents this type of abuse in which the auctioneer decrypts some bids and instructs favored bidders to refuse to unlock their bids (for example, because they offered far too much.)

In one embodiment, a bidder doubly encrypts her bids, first with the auctioneer's public key $PK_{AU}$ and then the public key $PK_S$ published by the time-lapse cryptography service S. This creates the ciphertext $c=E_{PK_S}(E_{PK_{AU}}(\text{Bid}))$, which is digitally signed by the bidder and may be published on a bulletin board. Thus no one, including the auctioneer, knows anything about her bid until either she reveals the random help value she used in $E_{PK_S}()$ or the appropriate amount of time elapses and the secret cryptographic key is published. In this example, no action of any bidder can prevent the auctioneer from decrypting her bid, or the public from using her encrypted bid $E_{PK_{AU}}(\text{Bid}))$ in verification protocols after the time-lapse expires.

Insider Stock Trades

An insider to a publicly-traded company could be legally obligated to issue advance commitments to stock transactions to mitigate the potential for abuse of inside information, as well as to protect the insider from false accusations of misuse of inside information. In certain circumstances, it is desirable that those commitments stay secret until shortly after the execution of the transaction in question. A commitment that does not guarantee nonrepudiation does not suffice since an insider may publish in advance a concealed commitment to a trade and then refuse to reveal it in the event the trade is no longer desirable to him. For example, if an insider encrypts his transaction in advance using a time-lapse cryptography service, he can always be legally compelled to complete the transaction although the details of the transaction remain secret until the appointed time.

In one embodiment, a protocol is used in which insiders issue their advance directives daily (say, for various lengths of time in advance) using the Service. These directives may be to buy, sell, or do nothing, which are indistinguishable under the semantic security of ElGamal. In this way an insider reveals no information to the market; while it is intuitive that this information could hurt the insider, some market microstructure research has shown that insiders can exploit disclosure rules due to the fact that the market cannot observe whether an insider is trading on private information or for personal portfolio reasons. Current SEC regulations require ex post disclosure for certain insiders, in part due to the argument that advance disclosure reveals too much information. Various aspects of time-lapse cryptography answers these issues.

Data Collected in Clinical Trials

In order to preserve the integrity of clinical trials, the data collected during such a trial may be encrypted using a time-lapse cryptography service. Because many of these trials are funded by companies who stand to make or lose significant amounts of money depending on their outcome, there is the potential for pressure to achieve a positive result. In various embodiments, use of the Service can mitigate this bias without revealing confidential information about the study before it is complete. In one example, time-lapse cryptography prevents unethical scientists from cheating, and benefits ethical scientists by protecting them against false claims of fraud or pressure from their financiers to achieve a particular outcome. According to one aspect, the property of early revelation also enables data collected in such trials to be revealed early in the case of necessity, for example, in cases that a drug is so effective it would be immoral not to offer it to the control group.

In one example, scientists' data collection process uses the Service to encrypt data directly as they are being collected, for example, by diagnostic devices or computer user interfaces. The scientists would not be able to see the data collected until the conclusion of a phase of the study; this prevents observations of trends in early data collection from affecting future data collection practices.

In another example, clinical data would be provided to the scientists in raw form immediately and to an auditing board encrypted via time-lapse cryptography. The scientists would preserve the confidentiality of their data during the study to prevent leaking of information by the auditing board, but would know that any tampering with results would be discovered after the expiration of the time-lapse.

Electronic Voting

In some voting applications, the publication of intermediate results may be undesirable, as it could unduly influence other voters or election officials. If votes are encrypted using time-lapse cryptography during an election, results can be kept completely confidential until polls close, as well as being assuredly revealed promptly when required.

Known Encryption Schemes

Applying an approach similar to time-lapse cryptography could be used as a means of securely generating and distributing the secret tokens with distributed trust.

In one embodiment, the service may consist of the following components:

A network of n participating parties $P_1, \ldots, P_n$

Distributed key generation of the public and secret keys

Verifiable threshold secret sharing of the secret key

Secure multi-party reconstruction of components of the secret key

Reconstruction and publication of the secret key

Secure public and private bulletin boards for posting of intermediate and final results The protocol is conducted by the Service consisting of n parties $P_1, \ldots, P_n$. In one embodiment, the protocol allows for the possibility that these parties may only be intermittently available. Another embodiment allows for the existence of adversaries that may attempt to disrupt the protocol in various ways. In one example, the generation of a public key and the corresponding reconstruction of the secret cryptographic key can be thought of as an "action" of the Service.

In some embodiments, there is assumed a threshold t such that during any one action, at most t−1 parties may attempt to disrupt the protocol by revealing secret information, submitting false information, or refusing to participate in the action. Any such party will be informally referred to as being improper. In one example, it is assumed that during the entire action, at least t parties strictly follow the protocol. Such parties will be informally referred to as being proper. In some embodiments, its is required that that n≧2t−1, alternatively it may be required that n>3t. One should appreciate that the requirement on the maximum number of parties that may be allowed to become improper may be modified to meet desirable security goals.

In one embodiment, there is a publicly agreed-upon cyclic group G and generator g∈G of prime order q. For this embodiment, assume that 2q+1 is a prime p (with q being prime), and that G is the set of quadratic residues modulo p; hence, all elements of G other than {1,−1} have order q. This ensures semantic security vis-à-vis quadratic residuosity. The publicly agreed-upon cyclic group G and generator g∈G may be provided through a bulletin board, and the n parties $P_1, \ldots, P_n$ "agree" to use the provided G and generator g∈G. One should appreciate that other methods of agreeing on the group, and other methods of distributing the relevant information are readily constructed.

In one embodiment, p and q are selected with appropriate attention to cryptanalysis, so that the encryption scheme used is resistant to known attacks involving vulnerabilities of particular "unsafe primes." According to some embodiments, reference to only one group G and public generator g will be made for both ElGamal encryption and the verification of shared secrets. One should appreciate that other groups G are possible, and one example includes elliptic curve groups that offer improved efficiency.

Some Implementation Considerations

According to some embodiments, the Service will be implemented on a network of autonomous computers, each of which represents a party $P_i$ in our protocol. In one embodiment, each party follows the protocol described in greater detail below; it obtains the schedule of public key generation and secret key reconstruction from a set of manager computers.

In one embodiment, to provide for further efficiency, reliability and resistance to attacks, a small network M of K managers act as a "managing team" for the Service. According to one aspect, the role of the managing team is to create the schedule of the public and corresponding secret keys to be produced by the Service; to maintain an internal bulletin board for use by the parties comprising the Service; and to maintain a public bulletin board for users of the Service. One should appreciate that these duties are not mutually exclusive, nor are they all required in any one embodiment; individually, in combination, or as subsets of the duties listed may each be implemented in one or more embodiments.

In one example, integrity of these bulletin boards is achieved by each manager maintaining his own copies of the internal and public bulletin boards. Parties and users will look at messages posted on each of the managers' copies of the bulletin boards and determine the correct values by a majority of postings. Such a determination is only necessary where postings disagree, but, it is assumed in certain embodiments that improper parties are attempting to disrupt the service. The managers are responsible for a public and an internal bulletin board for publication of results and internal communications among the parties, respectively.

In one embodiment, where one of the managers may be degraded or compromised and posts information inconsistent with the others', the information posted by a majority of the managers will be considered authoritative. According to some embodiments, each of the managers is to act autonomously according to pre-specified rules.

According to one aspect, the role of each manager $\{M_1, \ldots, M_K\}$ is to:

Accept requests from outside users for new keys to be generated with specified time lapses, and post them on the internal bulletin board.

Provide an authoritative source for instructions to the parties $P_i$ by posting the schedule of times T and delays δ: when public keys are to be generated and the time lapses associated with those keys. This schedule will be a combination of times for keys created according to a set periodic timetable as well as keys created at a user's request. Parties $P_i$ consult this schedule and act whenever the schedule requires a particular action (generate a new public key/reconstruct a secret key) according to our protocol.

Facilitate communication among the parties $P_i$ by maintaining the internal bulletin board.

Facilitate communication between the Service and the public by maintaining the public bulletin board and verifying that all public activities of the Service are signed and posted to that public bulletin board.

Protect the public and internal bulletin boards from denial of service attacks.

One should appreciate that each role be implemented individually, in combination, as a subset of these roles, and some embodiments may not implement these roles, and may contain different roles.

In one embodiment, the authoritative time for all actions shall come from an assumed universally accessible clock. According to one embodiment, no party or manager shall rely on an internal clock. In another embodiment, all computers comprising the Service should be maintained by administrators with experience in security considerations and running operating systems with up-to-date security patches.

Examples of Resistance to Attacks

In one embodiment, up to t−1 improper parties $P_i$ may attack the Service in various ways. Describe in detail below, are various embodiments that resist attack by these improper parties, and also describe the potentially vulnerable phase of certain embodiments.

Some examples of attacks include:

Sabotaging the joint construction of a valid, random public cryptographic key PK Posting an incorrect value of PK Prematurely reconstructing the corresponding secret key DK (prior to time T+δ)

Sabotaging the reconstruction of DK at time T+δ

In addition, an improper party can attack the distributed key generation algorithm described in some embodiments, by introducing a slight bias into the distribution of possible public keys. Some embodiment incorporate known methods of modifying the generation algorithm to prevent this type of attack. One should appreciate that the present invention is intended to encompass any method of distributed key generation that guard against new attacks.

According to one aspect, it is realized that that improper parties or users of the Service may mount denial of service attacks by attempting to overload the Service with internal or public bulletin board postings or requests for keys. In one embodiment, the managers of the Service can prevent such attacks by appropriate rationing of postings and requests. Of course, one should appreciate that there exist other known possible denial of service attacks, and corresponding countermeasures, that are not intended to be excluded from the scope of the present invention; and the detailing of a denial of service type attack should not be read as limiting.

Example of Secure Implementation

One example employs the known ElGamal encryption scheme. ElGamal's scheme is semantically secure under chosen plaintext attacks (CPA): adversaries can encrypt as many messages as they want and gain no information about the secret key or any other encrypted message. ElGamal is known to be trivially malleable and hence insecure under chosen ciphertext attacks (CCA-1). This known insecurity to chosen ciphertext attacks does not pose a security risk, because no ciphertexts can be decrypted with the secret key before its reconstruction and publication, and it is expected at that time that all ciphertexts encrypted with that key can be decoded by anyone.

According to one aspect, malleability is not of concern because it can be avoided by signing encrypted messages via an appropriate, nonmalleable digital signature scheme. In one embodiment, each party $P_i$ uses a computer that accurately and secretly performs the computations described and securely stores all $P_i$'s secret data. In another embodiment, the parties back up data in some secure way for disaster recovery, and in one example, the method makes stealing the secrets from backups at least as difficult as compromising the hosts themselves.

In another embodiment, each party $P_i$ can communicate privately and secretly with any other party $P_j$. In one example, each party may have a public/private cryptographic key pair and all parties will know every other party's public key. Alternatively, or in combination, one embodiment requires posting of various intermediate steps and results. In one example, the parties employ the internal bulletin board provided by the managing team for that purpose. In some embodiments, posting of any message m by a party $P_i$ is always be accompanied by $P_i$'s digital signature $SIGN_i(m)$. In one embodiment, each party $P_i$ accesses a universally accessible and tamper-resistant clock (one example includes the clock provided by the US NIST), that determines times for actions taken by the Service.

An Implementation Summary Using ElGamal Encryption

As discussed above, one embodiment uses a publicly known group G and generator thereof g. In one example, the Service creates and publishes an ElGamal public key $PK=g^x$ as described in greater detail below; the secret key is $DK=x$. To encrypt a message m, Alice first obtains the public key $PK=g^x$ and creates a random help value $y \leftarrow^R [1,q-1]$. She then computes the ciphertext c as a pair: $c=(g^y \pmod p, m \cdot g^{xy} \pmod p)$. Alice then sends this pair c to Bob. By elementary algebra, Bob can recover m when the Service publishes the secret key x or Alice later sends him the random help value y.

What is Done in Embodiments of the Service

In one embodiment, the Service creates, publishes and maintains "time-lapse cryptographic key structures" that represent public time-lapse cryptography keys with a specific lifetime. In one example, the Service may generate these structures on a periodic basis for public convenience; for example, each day it might release keys with a lifetime of 1 week, or every 30 minutes release keys with a lifetime of 2 hours. These schedules are posted by the managers to the public bulletin board. Alternatively, or in combination, the Service can accept requests from clients to generate new keys with a particular lifetime; the managers accept these requests and post them on the public bulletin board. Parties $P_i$ construct the key structures, individually sign them, and publish the signed key structures on the public bulletin board.

For each key required by convention or client request, the Service will generate a key structure $K_{ID}=(ID,T_{ID},\delta_{ID},PK_{ID})$ consisting of a unique identifier ID, a publication time $T_{ID}$ a "time-lapse" $\delta_{ID}$ and a public key $PK_{ID}$. Each party $P_i$ publishes the key structure and signature thereof $(K_{ID},SIGN_i(K_{ID}))$ on the public bulletin board.

At time $(T_{ID}+\delta_{ID})$ the Service reconstructs and publishes the associated secret key $DK_{ID}$. The public key and secret key for $K_{ID}$ are related by the equation $PK_{ID} \equiv g^{DK_{ID}} \pmod p$. According to some embodiments, g is public. In one embodiment, it is crucial that the secret key $DK_{ID}$ is known to no one, and never reconstructed, before the appropriate time. Each party $P_i$ publishes the reconstructed secret key and signature thereof $(DK_{ID},SIGN_i(DK_{ID}))$ on the public bulletin board.

There is a subtle issue in that reconstruction of the secret key is not in fact instantaneous. In practice of some embodiments, the Service will begin reconstruction of the secret key $DK_{ID}$ at time $(T_{ID}+\delta_{ID})$ and publish $DK_{ID}$ at time $(T_{ID}+\delta_{ID}+\epsilon)$ where $\epsilon$ is the time required to reconstruct the secret key. In some embodiments, $\epsilon$ is made negligible in comparison to any time-lapse $\delta_{ID}$ and is on the order of a fraction of a second, and therefore one can assume $\epsilon=0$ for convenience. At the beginning of the time lapse, we assume that the time $T_{ID}$ is an upper bound on the time when the key is released, and that the Service may release a public key required at time $T_{ID}$ at any time at or before $T_{ID}$.

Examples of What the Clients Do

In one embodiment, when Alice wishes to send Bob a message m, she requests or selects an appropriate key structure $K_{ID}$ from the Service. Alice does not need to identify herself in any way in order to do this; because the Service publishes the key structures on the public bulletin board, Alice may use any mechanism for obtaining the public key structure, e.g. a friend or an anonymous Web proxy server. Alice then verifies the published digital signatures $SIGN_i(K_{ID})$ match the published key structure $K_{ID}$ for a minimum of a threshold t parties $P_i$, and that these parties' $K_{ID}$ are identical. This guarantees that $PK_{ID}$ is the public key generated by all the proper parties, and its corresponding decryption key $DK_{ID}$ will be subsequently reconstructed and correctly posted by all the proper parties.

In another embodiment, to send the message, Alice encrypts m using ElGamal encryption; she creates a random help value $y \leftarrow^R [1,q-1]$ and privately sends Bob the pair $c=(g^y \pmod p, m \cdot PK_{ID}^y \pmod p)$ as well as the index ID of the key structure $K_{ID}$ whose public key she used. Alice may at this stage apply other appropriate cryptographic primitives, such as a digital signature or a message authentication code, depending on the application. In one example, if Alice wishes to send a longer message than can be accommodated by the group G, she may use the protocol to encrypt and send a secret key for a block cipher and encrypt her actual message with that block cipher, or she may break her message up into smaller chunks and encrypt each one.

Alice now has no ability to stop Bob from decrypting her message. Bob receives c and stores it, then waits for Alice to send y or for time $(T_{ID}+\delta_{ID})$, whichever comes first. If Alice sends him y, he decrypts m using $g^{PK_{ID}}$ and y; if she does not, he obtains $PK_{ID}$ from the Service and decrypts m using that.

Examples of the Protocol for the Parties $P_i$ in the Service

In one embodiment, a known distributed key generation (DKG) algorithm is used, and employ a known verifiable secret sharing (VSS) scheme to guarantee the authenticity of the generated keys.

In some embodiments, a set of "qualified" parties Q are determined, these are the parties that have complied completely and not been disqualified for any reason. According to one aspect, for any action (i.e. the construction of a public cryptographic key PK and the subsequent reconstruction of the corresponding secret cryptographic key DK), Q will include all proper parties. Consequently for certain embodiments, $|Q| \geq t$ at all times.

Example Process for Distributed Key Generation

Figure 1B:
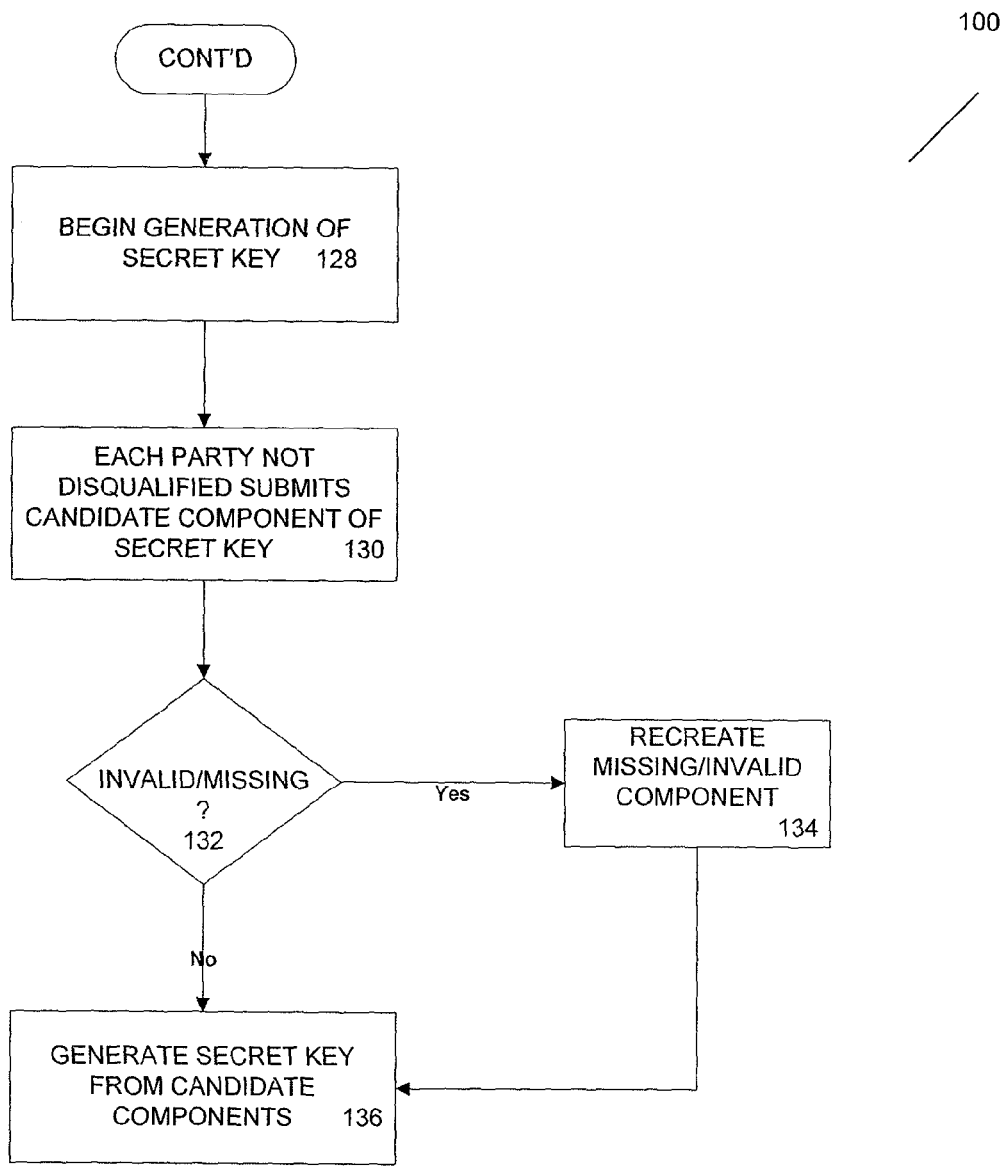

FIG. 1, illustrates an example of a process for generating a time-lapsed cryptographic key pair. In particular FIG. 1, describes process 100, wherein a plurality of parties (parties may represent computer systems or may represent actual users of a system) generate candidate key components for use in creating a time-lapse public key at 102. Generation of candidate key components typical involves the creation of both a candidate for a public key, and a candidate for a secret key, however these step may be separated in time, providing for verification of the generated components.

Step 102 may include, at a fixed "preparation interval" before a posted key generation time T is reached, having each party $P_i$ begin the protocol. The Service might schedule a 1-week key to be released each day at 10:00 am Eastern Time; the parties begin preparing this key a few minutes ahead of schedule so that it can be released at or before 10 am. It will be seen later on that parties to the Service may be disqualified during the creation phase of the public key by demonstrably violating the protocol. Again the set of parties that were not disqualified are referred to as the set Q of "qualified parties." In certain embodiments, all proper parties (and possibly some improper parties) $P_i$ will be members of Q, and the proper parties will have the same view of (value for) Q.

In one embodiment, at step 102, each party $P_i$ chooses a random $x_i \leftarrow^R [1, q-1]$. This $x_i$ constitutes $P_i$'s candidate component of the secret key. It will turn out that the secret key will be $x = \Sigma_{i \in Q} x_i \pmod{q}$. Each $P_i$ should then compute $h_i = g^{x_i} \pmod{p}$ and post $(h_i, SIGN_i(h_i))$ on the internal bulletin board at 104. The public key will be $h = \Pi_{i \in Q} h_i \pmod{p}$. This $h_i$ is $P_i$'s candidate component of the public key. Any party $P_i$ who does not post $h_i$ is disqualified. Thus all proper parties have the same view of which parties were disqualified for failing to post.

In one example of a process for sharing key components ensures that the secret key x corresponding to the public key h will be correctly reconstructed at time $T+\delta$, by protecting against the possibility that improper parties will refuse to reveal their component $x_i$ of the secret key x or reveal a false value instead of $x_i$. In one example, correct reconstruction includes the use of verifiable threshold secret sharing. During the sharing phase, further parties $P_i$ may be disqualified.

In one embodiment, at 106, each party $P_i$ creates a random polynomial of degree $k=t-1$ in $F_q[z]$:

$$f_i(z) = x_i + a_{1i}z + a_{2i}z^2 + \ldots + a_{ki}z^k$$

The secret key component is $f_i(0) = x_i$. During 106 each party $P_i$ may compute secret shares $x_{ij} = f_i(j)$ and verification commitments $c_0 = h_i = g^{x_i}$, $c_1 = g^{n_{1i}}$, ..., $c_k = g^{n_{ki}}$ at 108. (In one example, all commitments $c_i$ are computed (mod p).) At 110, each $P_i$ then privately sends to all $P_j$, $j \in [1,n]$, $(j, x_{ij}, SIGN_i(j, x_{ij}))$ and, at 112, posts on the internal bulletin board signed commitments $(c_0, SIGN_i(c_0))$, ..., $(c_k, SIGN_i(c_k))$. Every $P_j$ can now verify that $x_{ij}$ is a correct share by checking (*):

$$(*) \quad g^{x_{ij}} \equiv c_0 c_1^j c_2^{j^2} \ldots c_k^{j^k} \pmod{p}$$

(Index j is the argument to the polynomial for all $P_j$.)

At 114, parties $P_j$ verify received secret shares. According to one embodiment, at this point an improper $P_i$ can disrupt the process in one of two ways. S/he may send $P_j$ an incorrect share $x_{ij}$ of his component $x_i$ at 110. In one alternative, $P_j$ posts the triple $(j, x_{ij}, SIGN_i(j, x_{ij}))$ on the internal bulletin board, so that the proper parties can also check whether $x_{ij}$ is valid according to (*) at 120. If it is an invalid share, 120 NO, then $P_i$ is disqualified at 122 and the process may continue for valid parties. In another embodiment, all parties can check whether $x_{ij}$ is a valid share according to (*) and all proper parties will arrive at the same conclusion as to whether $P_i$ should be disqualified. If the share is valid (120 YES) the process continues to 124.

In one alternative, $P_i$ may have failed to send $P_j$ the share $x_{ij}$ at 110. When the share is missing (116 YES) $P_j$ posts a signed protest to the internal bulletin board. $P_i$ is then required to reveal $x_{ij}$ on the internal bulletin board, at 118. In one example, by posting a signed message $(j, x_{ij}, SIGN_i(j, x_{ij}))$. Every party can then verify the posted share $x_{ij}$ according to (*) at 120. If it is invalid, 120 NO, then $P_i$ is disqualified, and if $P_i$ does not respond $P_i$ is also disqualified. Again, all proper parties will reach the same conclusion as to the disqualification of $P_i$. At the end of one embodiment of the sharing process, all proper parties now have the same view of the value Q, the set of qualified parties. If the share is valid at 120 YES the process continues to 124.

According to one aspect, despite the posting of some shares in response to protests, the secrecy of the secret key is preserved until time $T+\delta$. In one example, the first shares $x_{ij}$ of the secret key component $x_i$ of a proper party $P_i$ are subject to an (unjust) demand by improper parties $P_j$. Thus, just a total of at most $t-1$ shares of $x_i$ will be posted. By the properties of secret sharing, the component $x_i$ remains random to the improper parties, and any observer of the internal bulletin board. In another example, the improper parties can circulate the shares they received anyway: however an adversary gains nothing by this revelation. In another example, shares $x_{ij}$ of an improper party $P_i$ who refuses to send $P_j$ its share were created. In such an example, the posting of $P_i$'s shares may reveal $x_i$. However, even if every improper $P_i$ broadcasts its component $x_i$ of the secret key x, the secret key itself remains secret until the components $x_j$ of the proper parties are revealed and this happens only at time $T+\delta$.

Alternative Embodiment: Example of Response to $P_j$'s Claim of Nonreceipt

Figure 2:
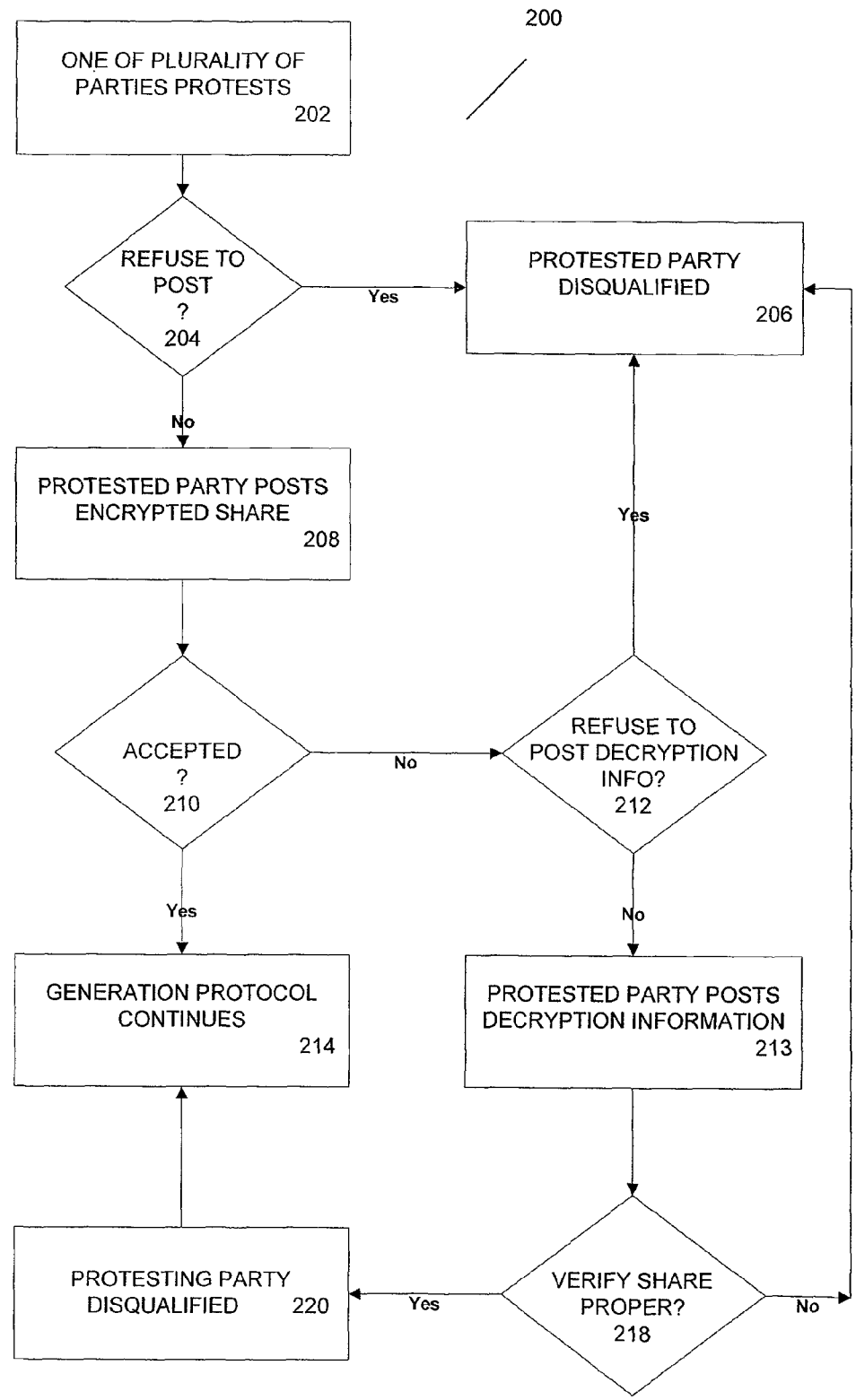
FIG. 2 illustrates an example of a process implementing various aspects of the present invention.

In an alternative embodiment, shown in FIG. 2 as example process 200, in response to $P_j$'s protest (202), $P_i$ must post $P_j$'s share of $x_i$ (204 NO) encrypted with $P_j$'s public key, $c = E_j(x_{ij}, r), SIGN_i(E_j(x_{ij}, r))$, on the internal bulletin board (208). If $P_i$ refuses to post (204 YES) $P_i$ is disqualified (206), and the generation protocol continues for non-disqualified parties. $P_j$ may accept (210 YES) or reject (210 NO) c as the encryption of a valid share. If $P_j$ accepts it (210 YES), the protocol continues and no one is disqualified (214). If $P_j$ rejects it (210 NO), then $P_i$ reveals the random help value r (212 NO) on the internal bulletin board, enabling everyone to decrypt $E_j(x_{ij}, r)$ (213). If $P_i$ refuses (212 YES) to reveal r he is disqualified (206). The honest parties can then check c and $x_{ij}$ as above (218). If c is not a valid encryption of $x_{ij}$ with $P_j$'s public key and random help value r (218 NO), then $P_i$ is disqualified (206) for posting false data. If the $x_{ij}$ is invalid according to (*) (218 NO), then $P_i$ is disqualified (206). If c and $x_{ij}$ valid (218 YES), then $P_j$ is disqualified (220) for making a false accusation, and the generation protocol continues for non-disqualified parties at 214.

In one embodiment, each qualified party $P_j$ holds the public key h, a component $x_j$ of the secret key x, and shares $x_{ij}$ for all qualified parties $P_i$. These latter shares are kept for the reconstruction of any missing components $x_i$ that are unavailable if $P_i$ is unavailable or corrupted.

Referring again to FIG. 1, at 124, every qualified party $P_j$, $j \in Q$ forms $h = \Pi_{i \in Q} g^{x_i} \pmod{p}$ and the key structure $K_{ID} = (ID, PK_{ID} = h, T_{ID}, \epsilon_{ID})$, and posts $(K_{ID}, SIGN_i(K_{ID}))$ on the internal and public bulletin boards at 126. One should appreciate that the parties proper during this action will post the same value for $K_{ID}$ and that the number of such proper parties strictly exceeds $n/2$. Thus, any user viewing the public bulletin board can unambiguously extract a valid value for $K_{ID}$ and the generated public key $PK_{ID}$ can now be used. In one embodiment, users can and should verify the digital signatures on data posted on the public bulletin board. In some embodiments, verification is automated.

In one embodiment, at the appointed time $(T_{ID}+\delta_{ID})$, for the reconstruction of the secret key $DK_{ID}$, all parties proper for this action participate. In one embodiment, at least t proper parties will do so. In one example, parties consult the public bulletin board maintained by the managers to obtain the list of reconstruction times, and begin the reconstruction protocol when the time $T_{ID}+\delta_{ID}$ for reconstructing $DK_{ID}$ is reached on the universal clock at 128.

In one example of a process for reconstruction, every party $P_i$ publishes its component $x_i$ of the secret key $x=DK_{ID}$ to the internal bulletin board at 130, and in according to one example, all proper parties do so. Even after this is done, certain components $x_i$ previously provided by some $P_i \in Q$ may be missing if the party $P_i$ in question is in fact improper. Every proper party then checks that for every $P_i \in Q$, the posted $x_i$ satisfies the equation $g^{x_i} \equiv h_i \pmod{p}$, at 132, where $h_i$ is as published previously. For any $P_i \in Q$ who has not posted $x_i$, 132 YES or for whom this verification fails, 132 YES, the parties need to reconstruct the correct $x_i$ at 134. In one example, at least the parties proper within this action will do so. Note that the parties $P_i \in Q$ are of no interest since their candidate shares did not enter into the construction of the secret key x.

During reconstruction, each party $P_j$ may post the $x_{ij}$ received from $P_i$ during the distributed key generation phase. In one example, every proper party $P_j$ has either received a verified $x_{ij}$ from $P_i$ which it posts, or in the "Sharing the Secret key" phase, discussed above, demanded of $P_i$ to post to the internal bulletin board the share $x_{ij}$ and verified it. Otherwise $P_i$ would have been disqualified and not included in Q.

Every proper $P_j$ now sees on the internal bulletin board at least t valid shares $x_{ij}$ of $P_i$'s component $x_i$ of the secret key $x=DK_{ID}$. A party $P_j$ uses any t shares $x_{ij}$ to reconstruct $x_i$ by polynomial interpolation.

At 136, every proper party $P_j$ has all the components $x_i$ for all the parties $P_i \in Q$. Each such $P_j$ computes the sum $DK_{ID}=x=\Sigma_i x_i \pmod{q}$ and publishes $(ID, DK_{ID}, SIGN_j(ID, DK_{ID}))$ to the public bulletin board. In one example, there will be more than n/2 signed postings agreeing on the value of $DK_{ID}$ and any user looking up the value of $DK_{ID}$ can unequivocally determine it, even if improper parties attempt to sabotage the reconstruction or the posting of the secret cryptographic key.

(Re)Constructing Components of the Secret Key

For various reasons, it may be necessary to create a new component of the secret key. For example, a party might have failed and need to be reinitialized, or may have been unavailable during the initial sharing. In another alternative, it may be desirable to add additional parties. In one embodiment, t parties remain operational and uncompromised, and using polynomial interpolation a new party may be added. In one example, rather than reconstructing the secret f(0), compute the secret key component for $P_z$ by computing f(z) from the arguments $z_i$ and components $w_i$ from at least t parties $P_i$. (In the equation for f(z), assume w.l.o.g. that $1 \leq i \leq t$, though any t distinct parties' data suffice.)

$$f(z) = \sum_{i=1}^{t} b_i w_i, \text{ where } b_i = \prod_{1 \leq j \leq t, j \neq i} \frac{z - z_j}{z_i - z_j}$$

(In this example, values $b_i$ are not secret and may be precomputed.)

Proactive Renewal of Components and Shares

In one embodiment, a time-lapse cryptographic key has a very long life (for example, a year or more), thus periodically redistributing the shares of each party's component of the secret key and shares thereof provides for additional security. In such an embodiment, an adversary has a limited time to obtain the required number of secret components before the components are renewed and past components are no longer useful. A protocol for redistribution for ElGamal cryptosystems is known. A redistribution system may be directly combined with the various aspects of the present invention, according to some embodiments.

In one example, when the time to renew the shares of parties' components is reached, each party $P_i$ creates a new random polynomial and shares its secret component $x_i$ with all active parties $P_j$, using verifiable secret sharing as discussed above. The components of parties $P_i$ who are unavailable or disqualified for any reason are then securely re-shared among all parties $P_j$, $j \in Q$ using secure multi-party computation.

Figure 3:
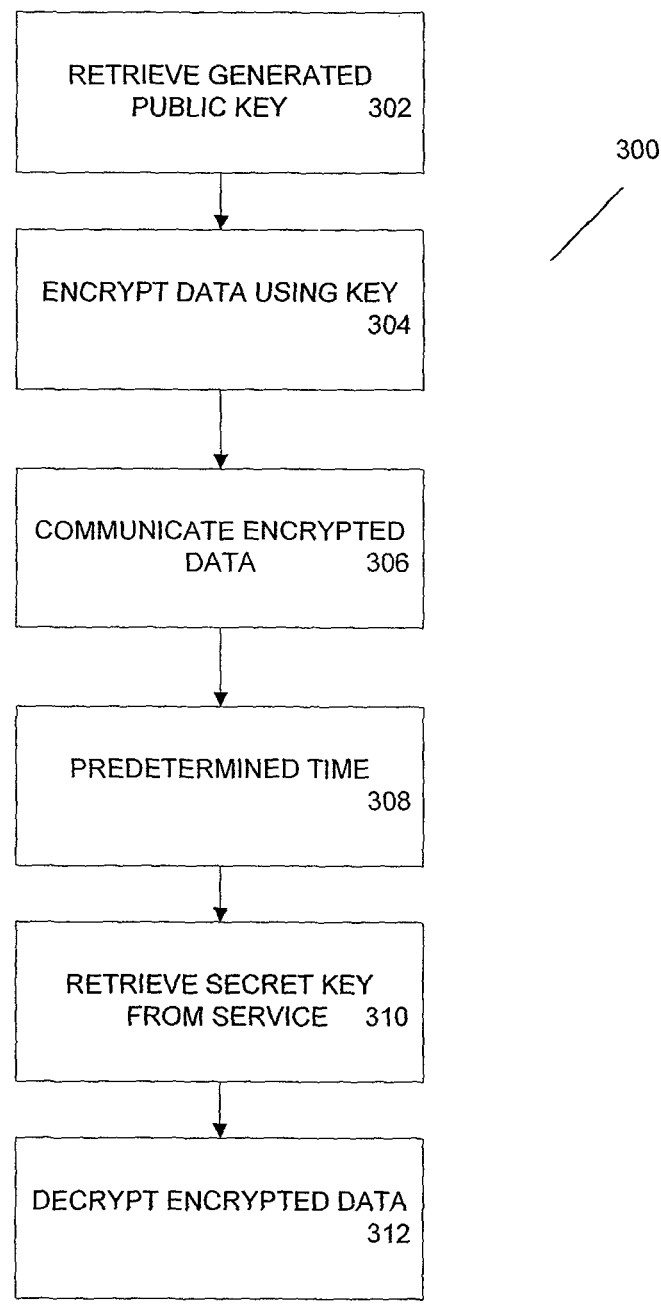
FIG. 3 illustrates an example of a process implementing various aspects of the present invention.

FIG. 3, illustrates an example of a process, 300, for encrypting data for future retrieval by a recipient. At 302, a user retrieves a public key for which a secret key will be generated at a later time. In one example a user may access a Service or a provider similar to the Service discussed above to retrieve the key. Such a Service or a provider may implement a process similar to the one discussed with respect to FIG. 1. At 304, the user encrypts data, a message, or other electronic information, at 304, using the public key and some helper value. At 306, the user communicates the encrypted data to a recipient. According to some embodiments, this encrypted message, where future access can be guaranteed has many useful applications, for example with bids in sealed bid auctions, insider trades, votes cast in elections, and/or in a clinical setting. After the predetermined time elapses at 308, the recipient may decrypt the encrypted information by accessing the corresponding secret key from the Service or a provider, at 310, and using the secret key to decrypt recover the actual information sent, at 312.

One should appreciate examples of suggested applications demonstrate broad applicability for time-lapse cryptography and various embodiments describes resistance to specific attacks. Use of time-lapse cryptography as a primitive cryptographic function allows for other known primitives to perform additional cryptographic functions. In one example, the sender Alice of a time-lapse encrypted secret to Bob can restrict subsequent revelation solely to Bob by further encrypting the ciphertext again with Bob's public key. In another, Alice can achieve non-malleability via a message authentication code, alternatively she can apply her digital signature to prove she sent the message, etc.

One embodiment of the present invention, may include an option for requesting an extension to the predetermined time. In one example, a subscriber may request that a time-lapse key be generated with a predetermined time for generation/release of the corresponding secret key. The subscriber may request that the secret key not be generated, where the subscriber has requested an extendable time. In different alternatives, the Service may identify keys that cannot be extended and/or keys that can be extended upon request, keys that may one be extended a certain number of times. In one example, a benefactor may wish the secret key to become accessible at his/her death rather than during his/her lifetime. As long as the benefactor, continues to request extension, the predetermined time with extension may provide for event based revelation. Retaining the properties of sender anonymity and guaranteed future decryption if the sender does nothing, allows the sender to delay decryption until a later time upon request to the Service. In one example, a will is encrypted, and the future testator postpones its revelation until required.

A cryptographic Service may be implemented on a distributed network of computers made available for public use. One alternative, is an implementation combining other cryptosystems using distributed generation of other cryptographic keys, and in particular embodiments that use composites of two large primes, such as those used in RSA and Paillier encryption.

One should understand that the present invention should not be limited to the illustration and examples described herein, for example, the homomorphic properties of ElGamal and Paillier encryption may be included in some embodiments.

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to facilitate methods of cryptographic encoding according to various embodiments of the invention. Further, the system may be located on a single computer or may be distributed among a plurality of computers attached by a communications network.

A general-purpose computer system according to one embodiment of the invention is configured to perform any of the described functions, including but not limited to generating cryptographic key components, constructing public keys, constructing secret keys, tracking periods of time, verifying proper participation by the plurality of parties, providing a bulletin board, restricting access to the bulletin board, providing digitally signatures, publication, secure communication, distributed key generation, verifiable secret sharing, disqualifying improper parties, generating secret key components, generating public key components, generating secret shares of secret key components, generating commitments, verifying generated cryptographic key components, verifying valid secret shares, verifying valid public key components, establishing criteria associated with generated keys, including time period, cyclic groups and prime generators, prime number generators, cryptographic component reconstruction, among others. It should be appreciated, however, that the system may perform other functions, including displaying information associated with a key generation service, processing request to extend time periods for generating secret keys, providing management services, encrypting data with generated public keys, as well decrypting data using secret keys, generating block ciphers, etc. Additional functions may also include encrypting bids in an auction, encrypting ballots in an election, encrypting information associated with insider trades, or other trades, encrypting data in a clinical trial, etc., and the invention is not limited to having any particular function or set of functions.

Figure 4:
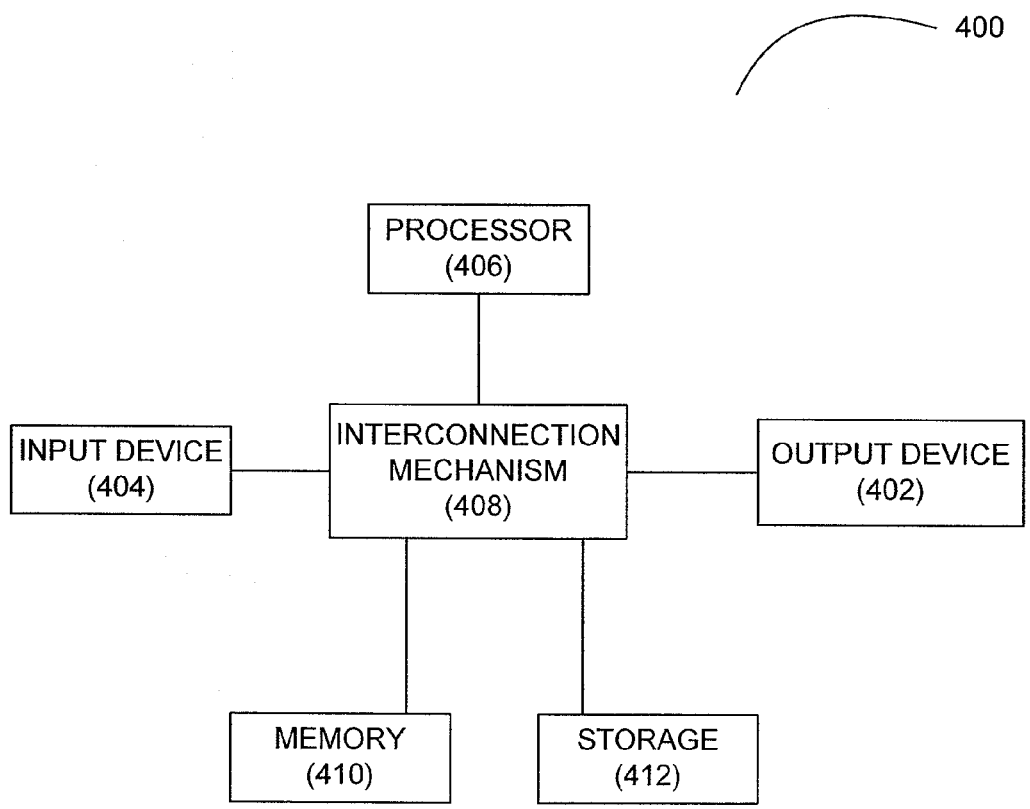
FIG. 4 is a block diagram of a system for cryptographic encoding according to one embodiment of the present invention.

FIG. 4 shows a block diagram of a general purpose computer system 400 in which various aspects of the present invention may be practiced. For example, various aspects of the invention may be implemented as specialized software executing in one or more computer systems including general-purpose computer systems 604, 606, and 608 communicating over network 602 shown in FIG. 6. Computer system 400 may include a processor 406 connected to one or more memory devices 410, such as a disk drive, memory, or other device for storing data. Memory 410 is typically used for storing programs and data during operation of the computer system 400. Components of computer system 400 may be coupled by an interconnection mechanism 408, which may include one or more busses (e.g., between components that are integrated within a same machine) and/or a network (e.g., between components that reside on separate discrete machines). The interconnection mechanism enables communications (e.g., data, instructions) to be exchanged between system components of system 400.

Computer system 400 may also include one or more input/output (I/O) devices 404, for example, a keyboard, mouse, trackball, microphone, touch screen, a printing device, display screen, speaker, etc. Storage 412, typically includes a computer readable and writeable nonvolatile recording medium in which signals are stored that define a program to be executed by the processor or information stored on or in the medium to be processed by the program.

Figure 5:
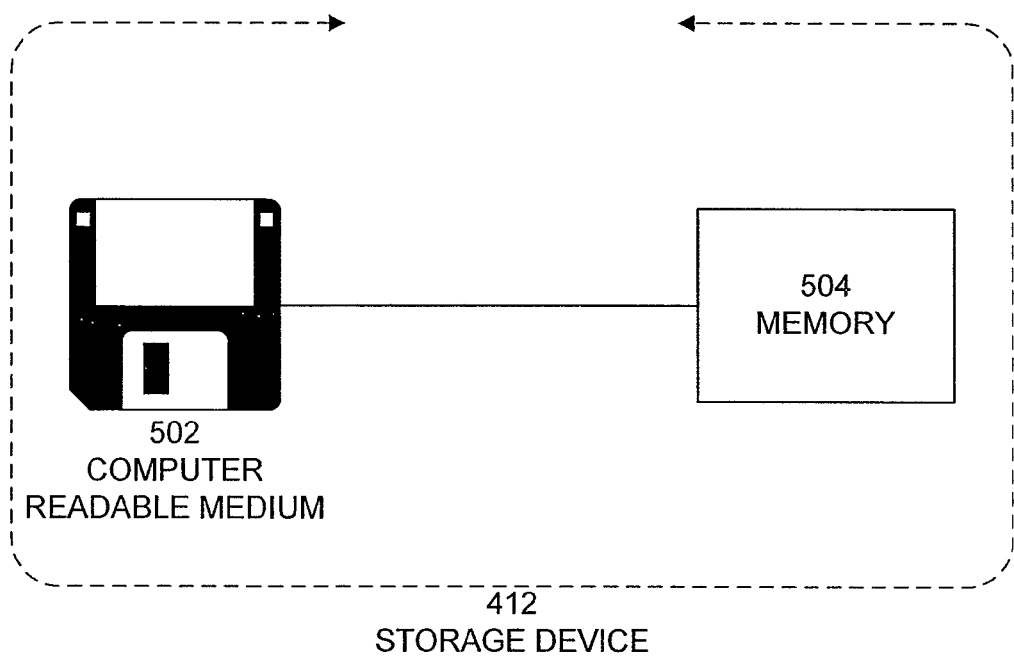
FIG. 5 is a block diagram of a system for cryptographic encoding according to one embodiment of the present invention.

The medium may, for example, be a disk 502 or flash memory as shown in FIG. 5. Typically, in operation, the processor causes data to be read from the nonvolatile recording medium into another memory 504 that allows for faster access to the information by the processor than does the medium. This memory is typically a volatile, random access memory such as a dynamic random access memory (DRAM) or static memory (SRAM).

Referring again to FIG. 4, the memory may be located in storage 412 as shown, or in memory system 410. The processor 406 generally manipulates the data within the memory 410, and then copies the data to the medium associated with storage 412 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 4. Various aspects of the invention may be practiced on one or more computers having a different architectures or components that that shown in FIG. 4.

Computer system 400 may be a general-purpose computer system that is programmable using a high-level computer programming language. Computer system 400 may be also implemented using specially programmed, special purpose hardware. In computer system 400, processor 406 is typically a commercially available processor such as the well-known Pentium class processor available from the Intel Corporation. Many other processors are available. Such a processor usually executes an operating system which may be, for example, the Windows-based operating systems (e.g., Windows Vista, Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems similar to system 400. For instance, the system may be a distributed system (e.g., client server, multi-tier system) comprising multiple general-purpose computer systems. In one example, the system includes software processes executing on a system associated with cryptographic encoding (e.g., a client computer system). These systems may permit the user to access a service for generating cryptographic key components, and/or provide access to functions for verifying key components, public keys, secret keys, secret key shares or may permit remote access to for example a bulletin board, communication services for plurality of parties, and other functions discussed above associated with generating and verifying cryptographic keys, distributed key generation, verifiable secret sharing, among other functions. There may be other computer systems that perform functions such as storing time period information, providing cyclic groups and prime generators, prime number generators, processing requests for extending time periods, etc. These systems may be distributed among a communication system such as the Internet. One such distributed network, as discussed below with respect to FIG. 6, may be used to implement various aspects of the present invention.

Figure 6:
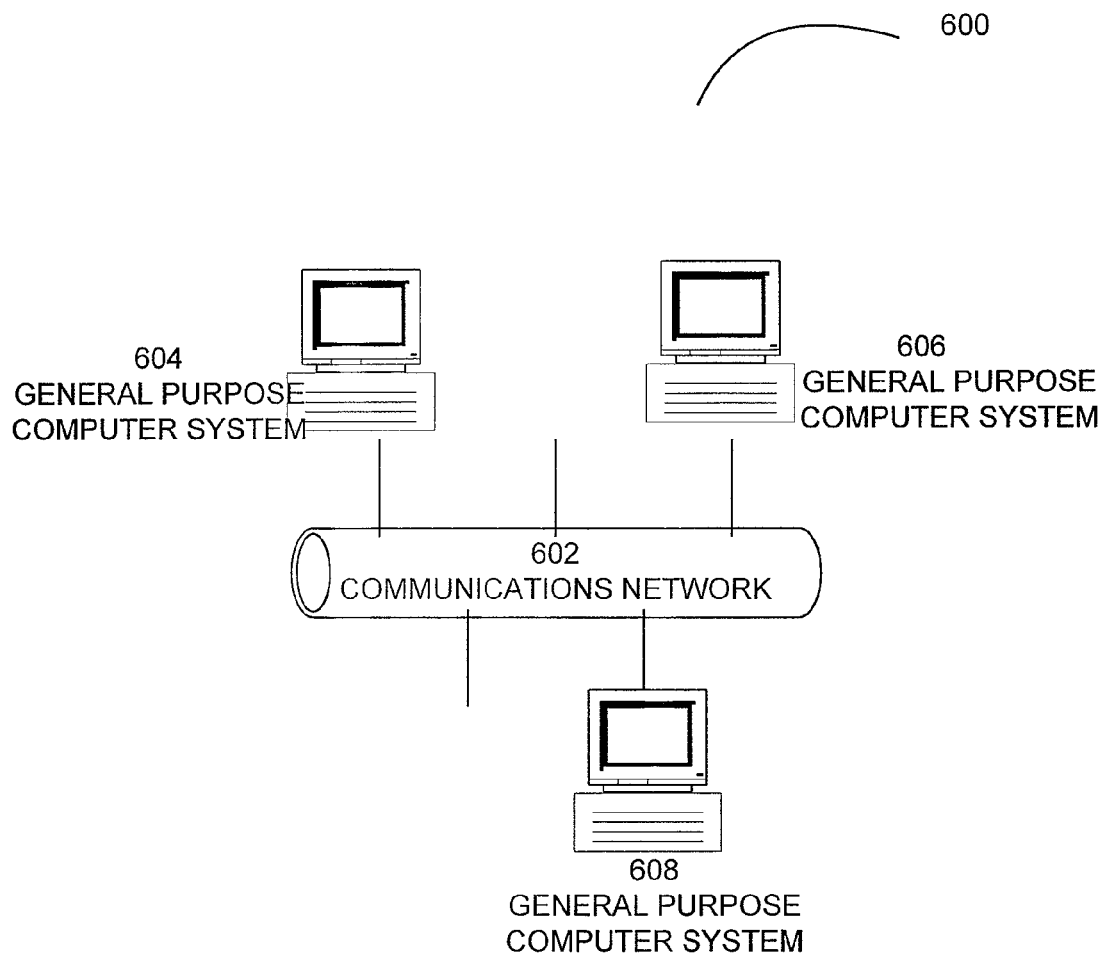
FIG. 6 is a block diagram of a system for cryptographic encoding according to one embodiment of the present invention.

FIG. 6 shows an architecture diagram of an example distributed system 600 suitable for implementing various aspects of the present invention. It should be appreciated that FIG. 6 is used for illustration purposes only, and that other architectures may be used to facilitate one or more aspects of the present invention.

System 600 may include one or more general-purpose computer systems distributed among a network 602 such as, for example, the Internet. Such systems may cooperate to perform functions related to cryptographic encoding and providing a Service for providing time delayed key pairs. In an example of one such system for cryptographic encoding, one or more parties operate one or more client computer systems 604, 606, and 608 through which cryptographic key components are generated, communicated, and verified. It should be understood that the one or more client computer systems 604, 606, and 608 may also be used to access, for example, a service that provides time-lapse key pairs based on various aspects of the invention as well as enabling a party to participate in such a service. In one example, a party interfaces with the system via an Internet-based interface. In another example, parties interface with the system via an Internet-based interface.

In one example, a system 604 includes a browser program such as the Microsoft Internet Explorer application program through which one or more websites may be accessed. Further, there may be one or more application programs that are executed on system 604 that perform functions associated with cryptographic encoding and providing and/or accessing a service for providing time-lapse key pairs. System 604 may include one or more local databases including, but not limited to, information relating to cryptographic encoding, as well as information relating to a service for generating and/or providing time-lapse key pairs.

Network 602 may also include, as part of the system for cryptographic encoding on one or more server systems, which may be implemented on general purpose computers that cooperate to perform various functions of the system for cryptographic encoding and with systems for generating and/or providing time-lapse key pairs, and other functions. System 600 may execute any number of software programs or processes and the invention is not limited to any particular type or number of processes. Such processes may perform the various workflows associated with the system for cryptographic encoding and may also be associated with the systems for providing a service for generating time-lapse key pairs.

The invention claimed is:

1. A computer implemented method for cryptographic key creation, the method comprising the acts of:
    accepting a plurality of cryptographic key components generated on a respective computer system of a plurality of parties thereby yielding a plurality of candidate cryptographic key components;
    verifying proper participation of the plurality of parties, wherein the act of verifying proper participation of the plurality of parties includes an act of:
        establishing submission of a public key component and information to establish a corresponding secret key component, wherein the public key component is derived from the corresponding secret key component; and
    constructing, by a computer processor, a public key based on a plurality of public key components from the plurality of candidate cryptographic key components submitted by parties determined to be proper; and
    generating, after a predetermined time, a secret key based on the secret key components corresponding to the plurality of public key components from the plurality of candidate cryptographic key components, wherein at least some of the secret key components are revealed after the predetermined time.

2. The method according to claim 1, wherein the act of accepting a plurality of cryptographic key components further comprises an act of accepting a public key component.

3. The method according to claim 2, further comprising an act of publishing the public key component wherein the published key component is accompanied by a digital signature.

4. The method according to claim 3, wherein publishing the public key component comprises posting the public key component and signature to a bulletin board.

5. The method according to claim 3, wherein the act of verifying participation of the plurality of parties further comprises an act of disqualifying any of the plurality of parties that did not publish the public key component.

6. The method according to claim 1, wherein the act of accepting a plurality of cryptographic key components further comprises an act of accepting information to establish a secret key component.

7. The method according to claim 6, further comprising an act of transforming the secret key component into the information to establish the secret key component.

8. The method according to claim 7, wherein the secret key component is transformed into at least one value.

9. The method according to claim 7, wherein the act of transforming the secret key component further comprises calculating and communicating a secret share of the secret key component as at least part of the information to establish the secret key component.

10. The method according to claim 7, further comprising an act of communicating the information to establish the secret key component to at least one of the plurality of parties wherein the act of communicating the transformed secret key component occurs through secret sharing.

11. The method according to claim 10, further comprising an act of digitally signing the information to establish the secret key component.

12. The method according to claim 7, further comprising an act of accepting a commitment for the information to establish the secret key component.

13. The method according to claim 12, further comprising an act of communicating the commitment and a digital signature of the commitment.

14. The method according to claim 13, wherein the act of communicating further comprises an act of posting the commitment and the signature to a bulletin board.

15. The method according to claim 12, further comprising an act of verifying the information to establish the secret key component against a respective commitment.

16. The method according to claim 10, further comprising an act of disqualifying any of the plurality of parties that communicates an invalid transformed secret key component.

17. The method according to claim 1, further comprising an act of publishing the public key by at least a portion of the plurality of parties.

18. The method according to claim 17, further comprising an act of verifying the public key.

19. The method according to claim 18, wherein the act of verifying a public key includes verifying a correspondence between the published cryptographic key and the information to establish the secret key component.

20. The method according to claim 1, further comprising the acts of:
establishing the predetermined time; and
further comprising an act of publishing a secret key component during a computation time period.

21. The method according to claim 20, wherein the predetermined time includes a time period for computation.

22. The method according to claim 20, further comprising an act of verifying the secret key component.

23. The method according to claim 22, further comprising an act of reconstructing a secret key component from the information used to establish the secret key component.

24. The method according to claim 20, wherein generating, at a predetermined time, a secret key based, at least in part, on at least a portion of a plurality of cryptographic key components, further comprises constructing the secret key from at least one published secret key component.

25. The method according to claim 24, further comprising an act of publishing the secret key and a signature on the secret key.

26. A non-transitory computer-readable medium having computer-readable signals stored thereon that define instructions that, as a result of being executed by a computer, instruct the computer to perform a method for cryptographic encoding, the method comprising:
accepting a plurality of cryptographic key components generated on a respective computer system of a plurality of parties to yield a plurality of candidate cryptographic key components;
verifying proper participation of the plurality of parties, wherein the act of verifying proper participation of the plurality of parties includes an act of:
establishing submission of a public key component and information to establish a corresponding secret key component, wherein the public key component is derived from the corresponding secret key component;
constructing a public key based on a plurality of public key components from the plurality of candidate cryptographic key components submitted by parties determined to be proper; and
generating, after a predetermined time, a secret key based on the secret key components corresponding to the plurality of public key components from the plurality of candidate cryptographic key components, wherein at least some of the secret key components are revealed after the predetermined time.

27. A system for cryptographic encoding, the system comprising:
at least one processor operatively connected to a memory, the processor when executing is configured to provide a plurality of system components, the system components comprising:
a cryptographic key generation component adapted to accept a candidate cryptographic key component from a plurality of parties to yield a plurality of candidate cryptographic key components;
a communication component for communicating between the plurality of parties;
a construction component adapted to construct a public key based on a plurality of public key components from the plurality of candidate cryptographic key components submitted by parties determined to be proper, wherein the construction component is further adapted to generate, after a predetermined time, a secret key, based on the plurality of cryptographic key components; and
a verification component adapted to verify proper participation of the plurality of parties, wherein the verification component is further adapted to establish submission of a public key component and information to establish a corresponding secret key component, wherein the public key component is derived from the corresponding secret key component.

* * * * *